L. P. WELCH.
BRAKE LOCKING DEVICE.
APPLICATION FILED JUNE 22, 1915. RENEWED DEC. 2, 1916.

1,232,872.

Patented July 10, 1917.

WITNESS
O. Johnson

INVENTOR
Levi P. Welch

BY
C.D. Haskins
ATTORNEY

UNITED STATES PATENT OFFICE.

LEVI P. WELCH, OF SEATTLE, WASHINGTON.

BRAKE-LOCKING DEVICE.

1,232,872. Specification of Letters Patent. Patented July 10, 1917.

Application filed June 22, 1915, Serial No. 35,543. Renewed December 2, 1916. Serial No. 134,756.

*To all whom it may concern:*

Be it known that I, LEVI P. WELCH, citizen of the United States, residing at Seattle, in the county of King and State of Washington, have invented a certain new and useful Improvement in Brake-Locking Devices, of which the following is a specification.

My invention relates to improvements in brake-locking devices for vehicles and the object of my invention is to provide a key-controlled locking mechanism in association with the hand-lever of an automobile brake, which locking mechanism shall be adapted to be operated to lock said hand lever in a required position to maintain such forcible engagement between said brake and adjacent rotatable parts as will prevent the rotation of the wheels of said automobile whereby an unauthorized person without the key of said locking mechanism, may not operate such automobile.

Figure 1:
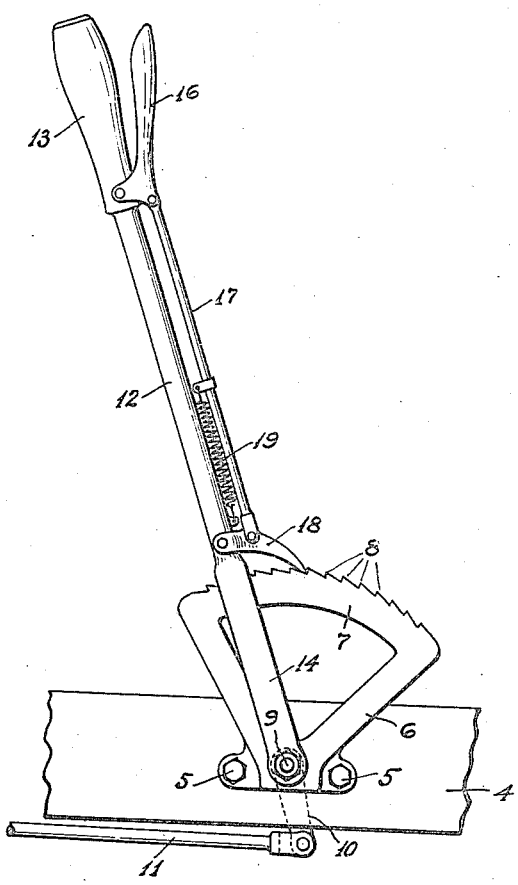
Figure 2:
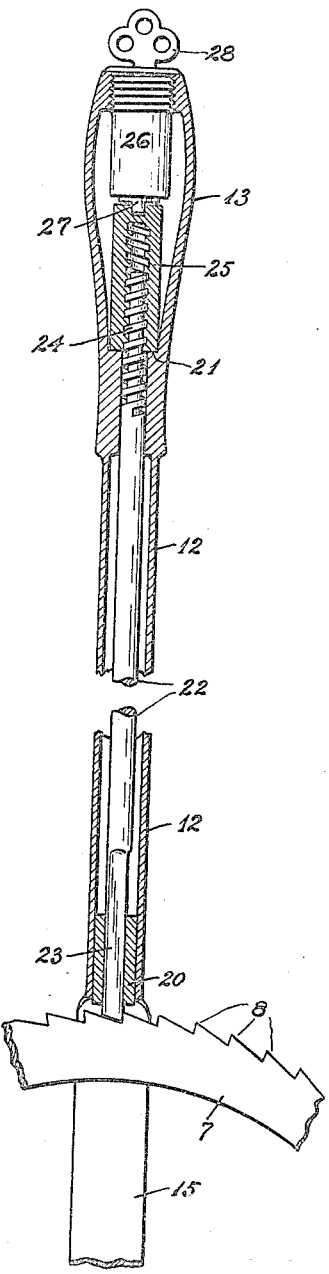

I accomplish this object by mechanism one form of which is illustrated in the accompanying drawings wherein Figure 1 is a view in side elevation of a hand-lever of an automobile brake embodying my invention, and Fig. 2 is an enlarged view in vertical mid-section of parts of the same.

Referring to the drawings, throughout which like reference numerals indicate like parts, 4 designates a portion of the chassis of an automobile to which is secured by bolts 5 a bracket 6 which is provided with an integral portion 7 of the form of a segment of a circle which portion 7 is provided with a plurality of notches 8 on its curved edge portion.

In the bracket 6 and the portion 4 of the chassis is bored a hole to form a bearing within which is rotatably disposed a shaft 9 that extends therethrough to project from both ends thereof, said hole being disposed concentrically with the circular portion 7.

Upon one end portion of said shaft 9, adjacent to the portion 4 of the chassis, is securely mounted an arm 10 whose free end portion extends downwardly lower than the portion 4 of the chassis, and such downwardly extended free end portion of said arm 10 is articulated with one end of a brake-rod 11 whose other end may be connected with brake mechanism of any well known form not shown, a hand-lever 12 is provided with a handle 13 on its upper end while its lower end portion is bifurcated and securely mounted on said shaft 9, one prong 14 of such bifurcated end portion being disposed on the outer side of the bracket 6 and the integral portion 7 while the other prong 15 is disposed on the inner side of said bracket 6 adjacent to the portion 4 of the chassis, the inner side of said bracket 6 being recessed to afford space for said prong 15 whereby the hand-lever 12 may be free to be swung forwardly and backwardly with its bifurcated end portion disposed astride of the bracket 6 and its integral notched portion 7 to rotatably move the shaft 9 thus to cause the arm 10 to actuate the brake-rod 11 to set or release brakes not shown.

As shown only in Fig. 1, the hand-lever 12 is provided with a well known form of means for maintaining it in a desired one of different positions with respect to the notches 8 to cause a required different amount of friction between the brakes and the operative parts of the automobile, which means comprise a lever 16 articulated with the handle 13 and with one end of a connecting rod 17 whose lower end is articulated with a pawl 18 that is articulated with the hand-lever 12 to adapt it to engage with the notches 8, there being provided a tension spring 19 that is disposed to adapt it normally to maintain the rod 17 in a position to permit the pawl 18 to engage with a desired one of the notches 8; the operation of which means is well known to those skilled in the art.

As shown in Fig. 2, the hand-lever 12 from its prongs 14 and 15 to the top end of its handle 13 is of tubular form and within its lower end portion adjacent to the prongs 14 and 15 is secured a bushing 20 which is provided with a square hole that extends through it in a lengthwise direction.

Within the lower end portion of the handle 13 the space is constricted in diameter and the space within said handle 13, above such constricted space, is enlarged in diameter to form a shoulder 21.

Slidably disposed within the hand-lever 12 is a locking-rod 22 whose lower end portion 23 is squared to adapt it to fit slidably within the square hole through the bushing 20 to project downwardly therefrom to adapt it to engage with a required one of the notches 8 in response to a downward movement of said locking-rod 22, The upper end portion 24 of said locking-rod 22 is provided with a screw-thread, upon which screw-threaded portion is disposed an internally screw-threaded sleeve 25 whose lower end engages with the shoulder 21 whereby when such sleeve 25 is rotatably moved in a required direction then the locking-rod 22 will be raised or lowered to engage or disengage with a required one of the notches 8 to lock the hand-lever 12 in a position that will cause the brakes connected with the brake rod 11 to be set, or, to unlock said hand-lever 12 to permit it to be moved to other positions as required.

Extending through the upper end of the handle 13 into the enlarged space therewithin is an internal screw-thread into which is screwed and fastened the barrel of a lock 26 which is provided with a downwardly projecting rotatable member 27 whose lower end is formed and disposed to fit into a transverse slot in the top end of the sleeve 25, said rotatable member 27 being adapted to be rotatably moved in response to the turning of a removable key 28 whereby the sleeve 25 may be rotated to raise and lower the locking-rod 22 in an obvious manner.

Preferably the lock 26 is of a well known form that is so constructed that its key, as the key 28, may be removed only when the locking-rod 22 is in the position, shown in Fig. 2, where its lower end is projected into one of the notches 8, thus always to leave the hand-lever 12 locked in a desired position.

The operation of my invention as illustrated and described herein requires no further description since it will be obvious to those skilled in the art.

Manifestly, changes may be made in the forms, dimensions and arrangement of parts of my invention without departing from the spirit thereof.

What I claim is:

A brake-locking device of the class described which embodies a hand-lever having a bifurcated end portion and provided with a hole extending lengthwise through its remaining portion; a bracket to which the bifurcated end portion of said hand-lever is articulated; a locking member of the form of a segment of a circle and provided with notches in its curved portion, said locking member being associated with said bracket and disposed between the two parts of the bifurcated end portion of said hand-lever; a locking-rod slidably disposed within said hand-lever and adapted to be moved to engage with a desired one of the notches of said locking member to detain said hand-lever in a desired angular position with respect to said locking member, said hand lever having the upper end of the hole abruptly enlarged to form a shoulder and the upper end of the rod being threaded, a nut engaged on the upper end of the rod and bearing against said shoulder, manually operative means associated with said locking-rod and said hand-lever for moving said locking-rod into and out of engagement with said locking member; and a key-controlled lock mounted in the upper end of the hand lever and having a downwardly projecting rotatable member engaging the nut.

It witness whereof, I hereunto subscribe my name this tenth day of June, A. D., 1915.

LEVI P. WELCH.

Witnesses:
FRANK WARREN,
A. HASKINS.

Copies of this patent may be obtained for five cents each, by addressing the "Commissioner of Patents, Washington, D. C."